United States Patent [19]  
Orlando et al.

[11] Patent Number: 5,197,916  
[45] Date of Patent: Mar. 30, 1993

[54] FISH SKINNER

[75] Inventors: Franklin P. Orlando; Thomaas Franco, both of Morgan Hill; Mark P. Parker, San Jose; Allen C. Thompson, Hayward, all of Calif.

[73] Assignee: Star-Kist, Inc., Long Beach, Calif.

[21] Appl. No.: 902,859

[22] Filed: Jun. 23, 1992

[51] Int. Cl.⁵ .............................................. A22C 25/17
[52] U.S. Cl. ..................................... 452/125; 452/99; 452/179
[58] Field of Search ................. 452/125, 119, 99, 173, 452/179, 182, 161

[56] References Cited

U.S. PATENT DOCUMENTS

| | | | |
|---|---|---|---|
| 671,421 | 4/1901 | Merkle | 452/99 |
| 2,020,579 | 11/1935 | Schlothan | 452/125 |
| 2,345,607 | 4/1944 | Kaplan | 452/99 |
| 3,513,893 | 5/1970 | Townsend et al. | 452/126 |
| 3,806,616 | 4/1974 | Mencacci et al. | 452/71 |
| 4,606,094 | 8/1986 | Evich | 452/125 |
| 4,765,030 | 8/1988 | Dubowik | 452/126 |
| 4,793,026 | 12/1988 | Braeger et al. | 452/127 |
| 4,811,462 | 3/1989 | Meya | 452/134 |
| 4,882,811 | 11/1989 | Ewing | 452/119 |
| 4,958,409 | 9/1990 | Braeger et al. | 452/161 |

FOREIGN PATENT DOCUMENTS

91/14372 10/1991 Japan .

Primary Examiner—Willis Little  
Attorney, Agent, or Firm—Burns, Doane, Swecker & Mathis

[57] ABSTRACT

A process and apparatus for skinning fish, particularly tuna fish, which comprises passing a precooked and cooled fish along conveyor belt means and the like while a series of rotating brushes above one side of and adjacent to the belly and back of the fish scrape the skin from those parts of the fish, passing the fish on the conveyor belt to a wheel around which the belt passes while a second belt contacts the opposite side of the fish and also passes around the wheel to hold the fish intact on the wheel until the fish is half way around the wheel and is turned over, depositing the turned over fish onto a third conveyor belt that receives the fish with the unscraped side thereof in the upper position, subjecting the unscraped side of the fish, and optionally, the belly and back thereof, to the rotating brushes to remove substantially all of the skin from the fish, and simultaneously spraying streams of water on the fish passing thereunder and the belts while removing skin from the fish and reducing deposit of the debris therefrom on the abrading apparatus.

13 Claims, 10 Drawing Sheets

FISH SKINNER

FIELD OF THE INVENTION

This invention relates to a method and apparatus for removing the skin from fish, particularly tuna fish during the processing thereof, prior to canning, further cooking, or the like. It is an improvement upon our copending application as to which we are co-inventors which is Ser. No. 07/481,198 of Feb. 20, 1990.

BACKGROUND OF THE INVENTION

The process and apparatus of the present invention, as well as that of the copending application heretofore mentioned, have been found very useful in that they represent an efficient, inexpensive and satisfactory system for skinning tuna fish. Further, as will be apparent below, the present invention is also a meaningful improvement over the aforementioned copending application.

These inventions are in sharp contrast to the many types of commercial fish skinner equipment and systems that have been used heretofore which comprise various combinations of abrasive or cutting devices. Other systems use chemical penetration and peeling to disintegrate and loosen the skin to remove the skins. These methods are complicated and expensive. Many of them do not work satisfactorily on tuna fish because they are harmful to the skin and the meat thereunder and cause disintegration of the tuna meat.

Attempts have been made to also remove the tuna skin with a frozen roller, a tomato disk scrubber, by microwave application, a modified tomato steam peeler, conforming diaphragms and various types of fish de-skinning equipment and high-pressure waterjet spraying means.

The foregoing systems are not satisfactory because they either do not remove enough skin, or remove excessive meat. The problem with de-skinner equipment and processes used prior to our copending application is that such de-skinners were designed to work on fresh fish. They do not work satisfactorily on frozen, or frozen and precooked fish such as tuna fish, because the processed fish de-skins differently from fresh fish.

The machine of my copending application, though useful and advantageous, is capable of removing the skin from only one side of the fish when it passes through the machine. Thus, although useful, particularly with large size fish, it does require the extra step of manually turning over the fish and refeeding it through the machine so that the other side of the fish can be treated. In the final analysis it is clear that there is a need for a new process and machine for de-skinning tuna capable of reducing processing labor while removing a minimum of 80% of the skin with a light meat yield loss of less than 1% of the weight of the frozen fish. This is in contrast to the prior art methods mentioned above wherein high pressure waterjet spraying removed less than half the skin with fresh loss in the range of 2-10% of the weight of the fish.

With the present invention it has been possible to remove a minimum of 80% skin from a fragile cooked and cooled fish with less than one percent flesh loss, as will be described hereinafter. The fish to be treated are supported on a conveyor belt while being brushed with a combination of overhead and side brushes. Such brushes are of a different construction and are run at different speeds to conform to the de-skinning needs. At the same time a small amount of water is used to help keep the belt and brushes clean and to aid skin removal. Meanwhile a wheel and belt arrangement are used to gently turn over the fish to expose the opposite side for de-skinning and similar treatment with brushes and water sprays. The machine uses simple paddle-type brushes that brush over the precooked and cooled fish and gently remove skin without removing an excess of flesh. The fish being treated is thus being conveyed and supported on a belt-type surface while passing through the brushes. As heretofore stated, the great advantage of the machine is that a fish can be treated on both sides and the back and belly thereof can be de-skinned without manually turning the fish during the operation. This cleaning is effected by the brushes which may be mounted in a fixed or solid manner, or made moveable, to compensate for a changing fish shape. The brushes can also be operated to rotate with or against the direction of fish travel, and likewise the fish can be fed head-end or tail-end first. It is preferred to design and mount the brushes so that they rotate in the direction of fish travel, to thus enable the brushes to aid the fish through the machine. Nevertheless, the machine can be operated to de-skin a fish effectively with the brushes rotating opposite to the direction of travel of the fish.

As above-stated, de-skinning of one side and at least a portion of the back and belly of the fish when completed enables the fish to be turned over so that the bottom side, and optionally the back and belly, are exposed for completion of brushing. Such turn over of the fish can be effected in two ways. One is by passing the fish over a turn over wheel as discussed hereinafter, and the other is by sliding the fish down a spiral chute and arranging delivery of the fish so that it is turned over upon delivery from the end of the chute. The turn over wheel method is preferred because it gently turns the fish without disturbing the orientation or spacing thereof, and with no detectable damage to the fish.

The side brushes of the machine can be operated in a variety of ways that enable the skin to be removed from the belly and back in pairs so that both are brushed simultaneously or one brush can be opposed with a live surface belt or a sliding surface. A preferred method is to use two opposed spring loaded brushes each running at a different speed. The brush used to skin the back is generally run at a greater speed than the brush used to de-skin the belly. Because of the nature of the tuna fish, the more aggressive brushing by the high speed brush is desirable to remove the back skin in contrast to the belly skin. The speed of each brush can be optimized and adjusted to the rate that is most satisfactory for the task at hand. It is to be further noted that the fish can be arranged in a single lane, on a somewhat narrow belt, or for quantity treatment and greater efficiency, a wider belt can be employed and an additional line or lines of fish can be placed thereon for treatment in the machine. FIGS. 6 and 7, respectively, show mounting arrangements for the substantially vertical edge brushes, and the substantially horizontal side brushes. FIG. 4 shows the preferred arrangement of the brushes when finally assembled, as will be explained hereinafter.

Efficiency in removal of skin from each fish is substantially enhanced by spraying water directly on the bristles of the brushes. Preferably, the spray is directed against the bristles just before they contact the skin surface to be removed. Such a spray assures that any debris that sticks to the bristles during a previous revolution of the brush is washed away and that the scraping or abrading action on the skin is always in the presence of water. The spray also assures that the surface of the conveyor belt is sufficiently wet to discourage abraded debris, from previously skinned fish, from sticking to the upper conveying surface. Further, the surface of an already de-skinned fish is preferably kept wet enough by water from such spray to prevent deposit of debris from other fish being cleaned simultaneously from sticking to its cleaned surface.

DESCRIPTION OF THE DRAWINGS

A more complete understanding of the invention can be had by reference to the accompanying drawings which are an integral portion of this specification.

The drawings are as follows.

DESCRIPTION OF THE PREFERRED EMBODIMENTS

Figure 1:
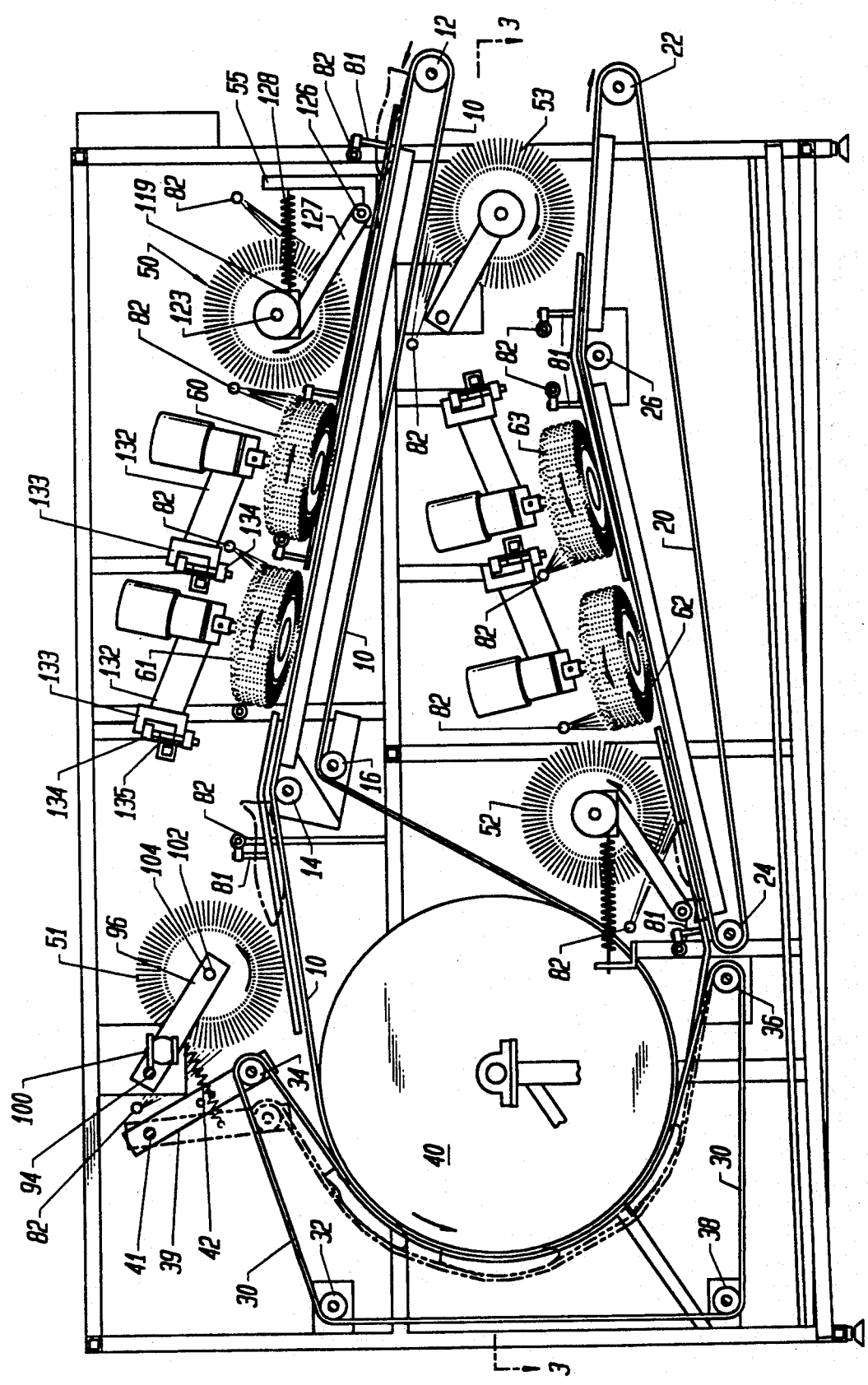
FIG. 1 is a side elevation of the machine in section.

It will be noted from the drawings particularly FIG. 1 that the essential parts of the apparatus of the invention comprise upper conveyor belt 10, lower conveyor belt 20, turn over wheel conveyor belt 30, and turn over wheel 40, all of which serve as a means for conveying fish through the machine while it is subject to the process of the invention.

Other essential features include overhead deskinning brushes 50, 52 and polishing brushes 51, 53. Bottom edge and belly edge brushes 60 and 61, and if required, brushes 62, and 63, respectively, for attacking those parts of the fish, are shown in the attached drawings (see FIGS. 1 and 4). The overhead and edge brushes are arranged to de-skin two lanes of fish simultaneously.

Figure 4:
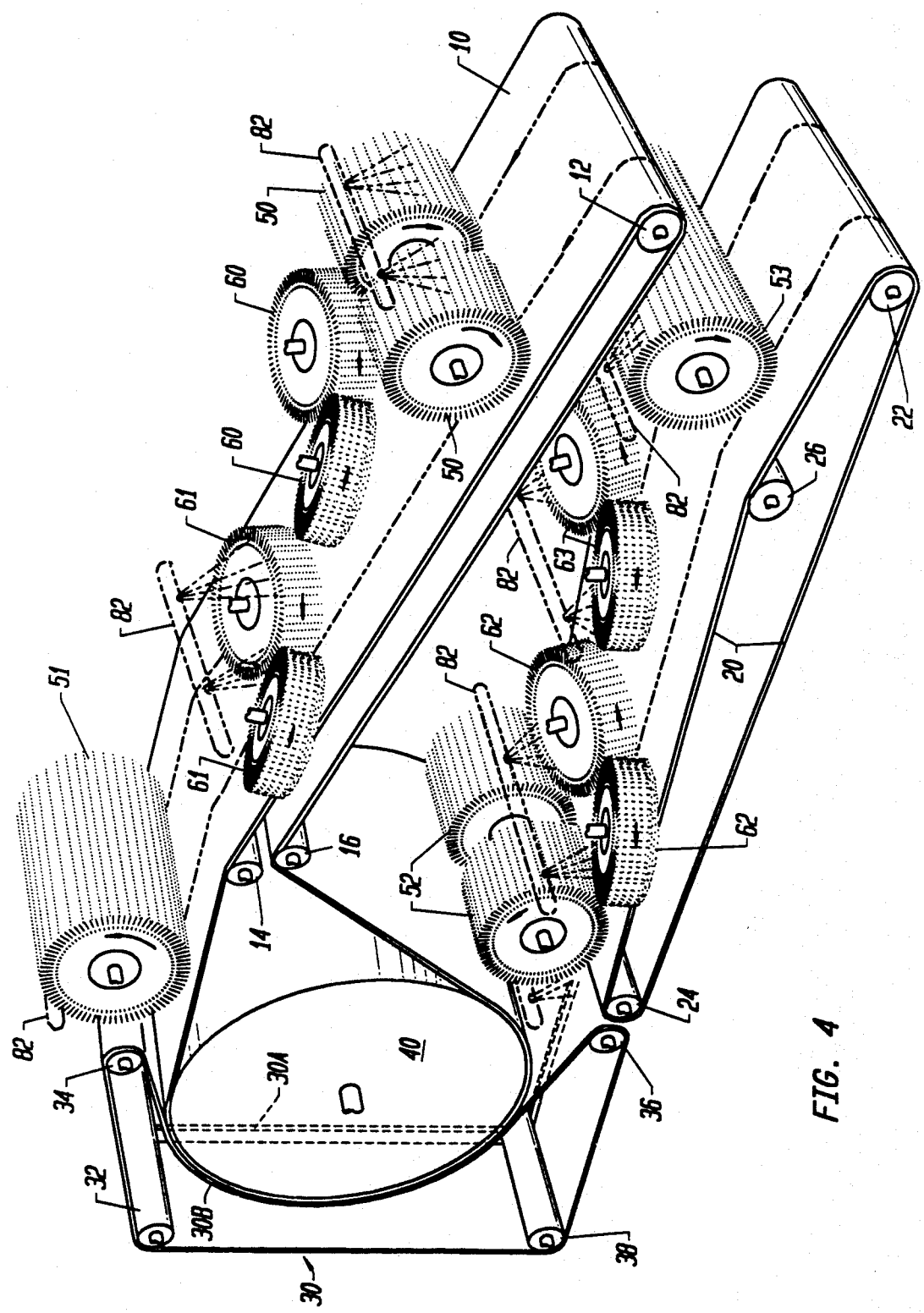
FIG. 4 is a perspective view showing the brushes and the belts including the two lanes on which and through which the fish will travel.

A spray system for maintaining the wetness of each brush is also shown in FIGS. 1 and 4. As indicated, at least one nozzle 84 is directed to spray water on the outer ends of bristles of each brush ahead of their contact with the fish. The nozzles are desirably mounted on manifold pipes 82 so that a broad, generally flat, oval spray extends laterally across the bristles, so as to strike not only the bristles, but also to was the conveyor belt and fish passing under it. Water is pumped under moderate pressure and flow rate to each manifold 82 by tubing (not shown). Addition nozzles may be used, if desired, as in spraying polish brushes 51 and 53 where three nozzles are particularly useful. Such brushes and their accompanying spray not only remove any debris left on the de-skinned fish, but also clean any debris backwardly on the belts 10 and 20, by reason of the counter-rotation relative to the upper surfaces of belts 10 and 20.

As can be seen from the drawings, upper conveyor belt 10 is a continuous endless belt that runs around roller 12 in an upwardly inclined direction, then runs over roller 14, and then to the topside of and around turnover wheel 40 and back over roller 16 to original roller 12 to complete its path of travel and for further revolution around such path, all as indicated in the direction of the arrows. In like manner, lower conveyor belt 20 is an endless belt that runs over rollers 22, 24 and 26 by the direction of the arrows. The greater part of the path of travel of belts 10 and 20 is at an inclined grade which is advantageous for carrying out the operation as will be explained later As will be further noted from FIG. 1, conveyor belt 30 is mounted about rollers 32, 34, 36 and 38, and is arranged about turnover wheel 40 to cooperate with belt 10 in holding fish carried on belt 10 as they are passed around turnover wheel 40 in the same direction as belt 10, and then pass the fish onto lower conveyor belt 20. Where, as in the embodiment of FIGS. 1 and 4, two lines of fish are to be processed simultaneously, belt 30 is preferably a pair of independent belts 30a and 30b so that the size and spacing of the individual fish being turned need not interfere with by simultaneous operation of the other line, while at the same time securely holding each fish separately during the turnover operations.

A useful but not absolutely essential arrangement for the apparatus of the invention is the provision of gates or rails 80 which are provided at the edges of the upper and lower conveyor belts 10 and 20. Such rails are useful at intermediate locations when more than one line of fish is treated. Rails 80 serve to guide fish being processed and to assure that they are maintained in a relatively straight path as they are processed along the length of the machine, and are a preferred embodiment of the machine. It will be noted that where there are two or more lines of fish on one belt (see FIG. 2) that rails are provided on both sides of the multiple paths for the fish.

Figure 10:
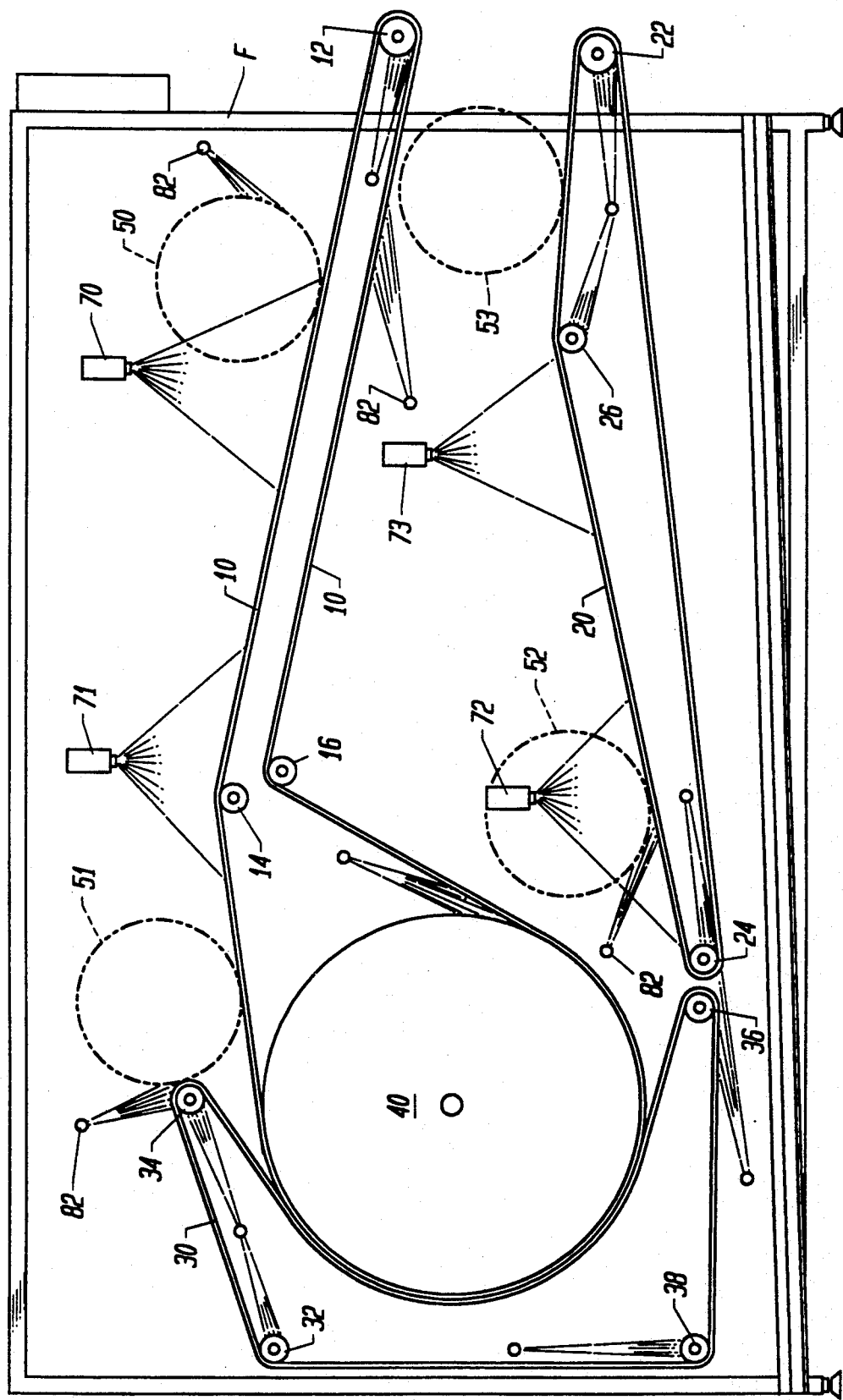
FIG. 10 is a side sectional view of the machine (with the brushes removed) showing advantageous locations of additional spray cleaners along the path of travel of the fish which assist the brush spray systems of FIGS. 1 and 4 to clean the belt systems.

Another useful feature of the apparatus and process of the invention is the auxiliary spray system shown in FIG. 10 wherein a pair of upper sprays 70 and 71 and a pair of lower sprays 72 and 73, respectively, are employed to clean the machine, and particularly the conveyor belts. These sprays are particularly useful in cleaning the belts and brushes of residual bits of fish skin when no fish are being processed by the machine. In this regard, "polishing" brushes 51 and 53 have additional functions depending upon their operating position relative to conveyor belts 10 and 20. As seen in FIG. 10, both brushes are allowed to rotate downwardly to fully contact the upper surface of their associated belt during machine cleaning. On the other hand, during normal fish skinning operations, both brushes are lowered into a position slightly raised off the belt surface so as to lightly brush debris from the cleaned surface of the fish.

Additionally, advantage is taken of this raised position of final brush 53 to clean the lower surface of belt 10 as it passes overhead around pulley 12 to return to its fish carrying position.

The foregoing components are all mounted on a frame F which can be of any convenient design so long as it is of sufficient strength to support the weight of the machine parts and enable them to be assembled in a manner to permit the apparatus and the process of the invention to be constructed and carried out as described herein. It will be noted that the present frame structure F includes top, bottom and side components as well as upright end and intermediate frame elements which serve as supports. They are of conventional design and will not be identified further except where they may be useful when reference is made to the assembly and mounting of the various brush, spray, turnover wheel, guides and other machine components and the like discussed herein.

In the machine of the drawings, it will be noted that upper conveyor belt 10 runs from a location adjacent the side of the frame F of the machine in an upward inclined direction at a grade of about 10 to 12 degrees for approximately two-thirds the distance from roller 12 to turnover wheel 40. The lower outside end of belt 10 adjacent to roller 12 provides a convenient point at which the fish to be processed can be fed to the machine.

Thereafter as belt 10 reaches a point approaching turnover wheel 40 where roller 14 is located, belt 10 is inclined downwardly and encircles wheel 40 and then returns upwardly to pulley 16 and parallels the position it took in its upward movement as it passes down and over rollers 16 and back and around roller 12 in its endless path. Belt 10 in its travel around turnover wheel 40 meets with belt 30 in its travel around a corresponding portion of wheel 40. Rollers 34 and 36 are located so that belt 30 meets and converges with belt 10 at a location in the upper part of turnover wheel 40 and overlaps belt 10 in its path around the wheel until it reaches the lower area thereof adjacent the end point of lower belt 20 at roller 36 of belt 30 and roller 24 of belt 20, respectively. Then belt 30 in its return travel at its furthest forward point about pulley 36 is adjacent to belt 20 in the lower section of the machine within frame F and it will be noted belt 20 travels in an upward grade or incline to a point (pulley 26) near the end section or opening in the frame so that belt 20 is adjacent to and located below belt 10.

It will also be noted by reference to the drawings (see FIGS. 1, 2 and 3) that a pair of guides or rails 80 are provided to keep properly aligned in their respective paths the fish that are being treated. The guides are attached to supports 81 mounted as required at points on frame F. The mountings 81 are securely affixed to the frame members F by bolts 82. The guides assure that the fish being treated on the belt stay on the belt and are properly aligned as they pass under and through the brushes. They are particularly useful when the machine for de-skinning is designed to treat fish in two or more lanes.

A fish placed on upper belt 10 as it is traveling in an upward direction from roller 12 is exposed to contact with the rotating brushes over and adjacent to them. When the fish reaches the high point of belt 10 it is close to and above the upper end of turnover wheel 40, and as it continues on its path on belt 10, the bottom or opposite side of the fish is still resting on belt 10. Meanwhile, belts 30a and 30b rotating in the same direction contact the upper side of fish in each lane as they pass around wheel 40 on belt 10. See FIGS. 1, 2 and 3. After completion of their independent travel about turnover wheel 40, turnover belts 30a and 30b withdraw from contact with turnover wheel 40, near the base thereof. Upper conveyor belt 10 then moves upwardly leaving the untreated side of the fish (which was the bottom side thereof when it was cleaned and polished on belt 10) facing upwardly as it rests on lower belt 20. The fish continues on its path through the machine on belt 20 to the end thereof, as belt 20 passes around roller 22 just below the entrance end of the machine on belt 10, where the fish were originally fed thereto. In this manner, the fish is turned over so that the original bottom side is exposed for brushing and cleaning as required.

As will be noted the pressure exerted by belt 30 is controlled by pulley 34 mounted on pivot bar 39. Bar 39 is arranged to pivot at 41 and is moveable at its opposite end wherein roller 34 is mounted. A spring 42 is mounted to control the position of belt 30 and the pressure exerted thereby to hold the fish against wheel 40. Pivot bar 39 is thus adjustable to provide the required pressure on belt 30 to maintain the fish in place on wheel 40 as the drum rotates to keep the fish in proper place for rolling it down to belt 20. By proper adjustment of pivot bar 39 the pressure exerted by belt 30 on the fish while it is on belt 10 as it passes around wheel 40 can be such that the fish thereon to be treated can be held in place and not crushed.

Thus, a fish entering onto upper conveyor belt 10 first passes up the belt under brush 50 where the bristles thereof scrape against it to remove the skin on the top side. It then continues upward through the brushes 60 and 61 which remove the top edge and bottom edge or belly skin, that is the back and belly of the fish, and then continues forward and is contacted by polishing brush 51. The primary purpose of brush 51 is to serve as a polishing brush and remove particles of skin thrown forward by edge brushes 60 and 61. Without it, loose skin is left on the otherwise de-skinned upper side. Any additional de-skinning is incidental. That is why this brush is called a "polishing" brush. Further in regard to brush 51 it is to be particularly noted that the rotation of this brush is counter-clockwise, as seen in FIG. 1, so that any pieces or bits of skin removed from the de-skinned surface are cast back into the machine. The fish continues into the area of the turnover wheel where it is squeezed between belts 30 and 10, which by their mounting and construction are adapted to yield to permit the fish to be held in place by the pressure between belt 30a or 30b and belt 10. Such pressure maintains the fish in place without the fish being crushed while it is being turned over. The fish is then discharged at the foot of turnover wheel 40 and thus moves from turnover belt 30a or 30b to lower belt 20. In the course of traveling around turnover wheel 40 by cooperating belts 10 and 30 the fish is positioned so that the unscraped side thereof faces upward on belt 20 as it passes under scraping brush 52 where the skin and scales are also removed from that side. Edge brushes 62 and 63 once again may contact any unskinned portions of the belly and back edges of a fish, for further removal of the skin. The fish then passes under a final overhead de-skinning brush 53 which removes any residual side skin or debris to polish the exposed meat.

Figure 2:
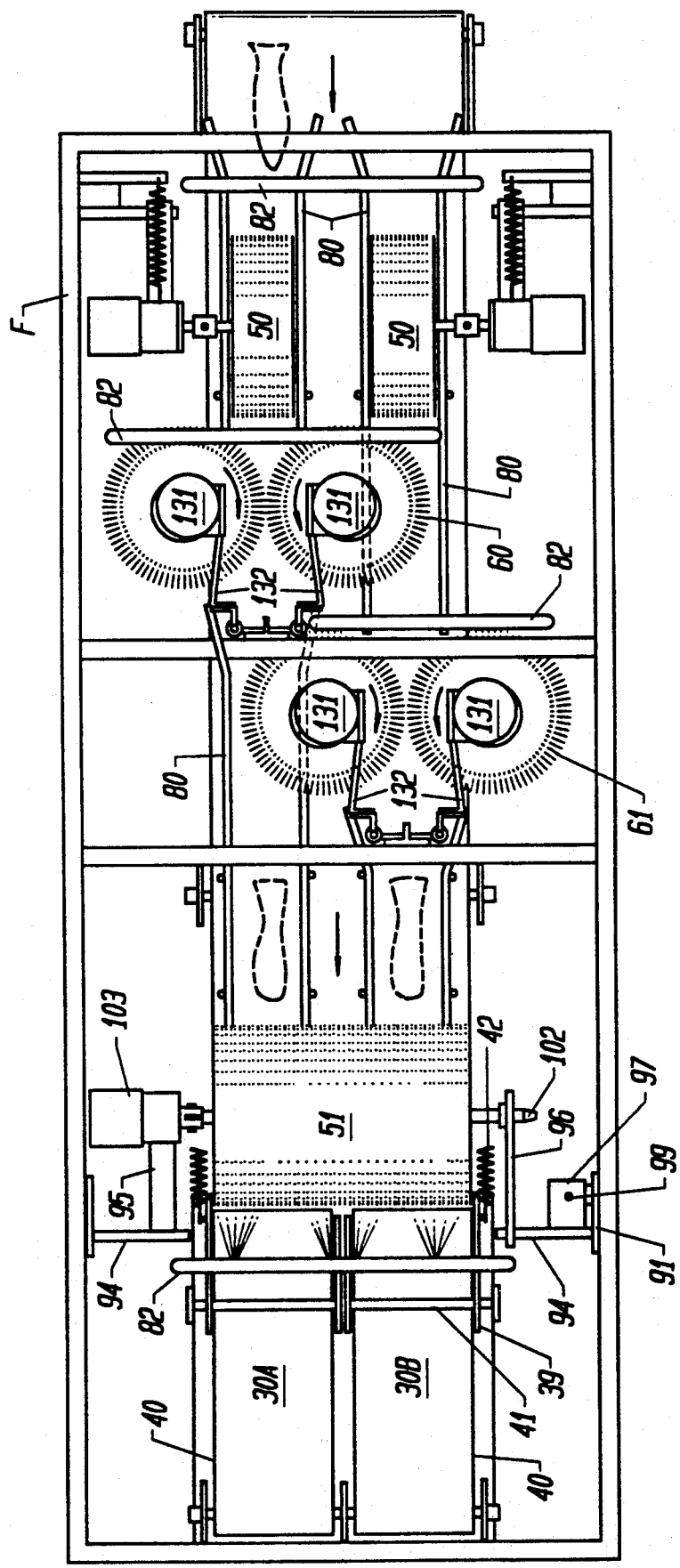
FIG. 2 is a top plan view showing the upper conveyor and treating area of the belt of a machine equipped to treat two lanes of fish.

In a preferred embodiment in lieu of single belt 30 which serves to hold the treated fish in place as it rotates around wheel 40, separate belts 30a and 30b can be provided to hold treated fish in place as they traverse separate paths around common wheel 40. For example, reference to FIG. 2 shows two parallel belts 30a and 30b rotating around turnover wheel 40.

Figure 5:
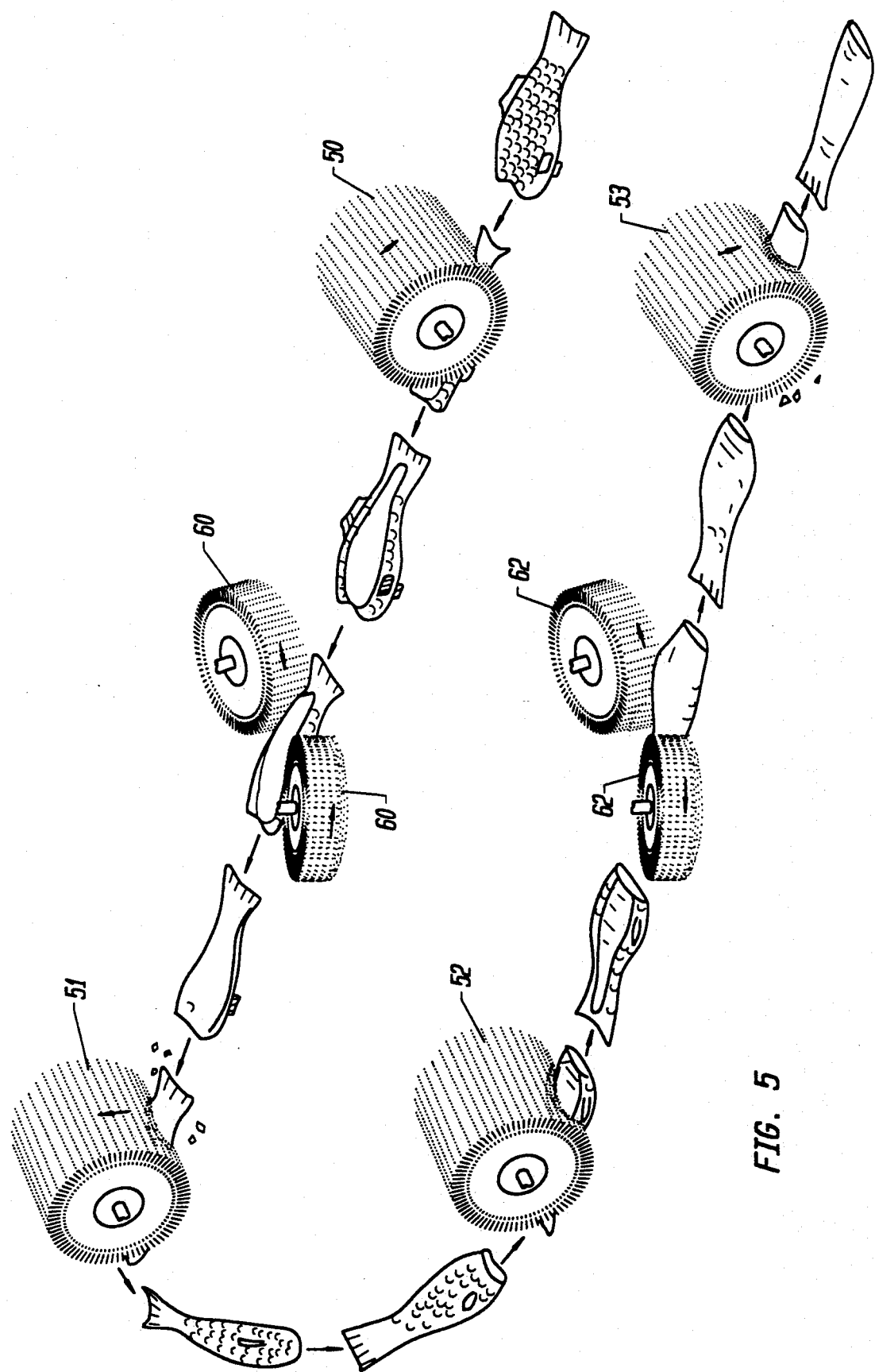
FIG. 5 is a schematic view of one lane of fish showing the method by which the fish is skinned and cleaned on both sides as well as the top edge and bottom.

FIGS. 4 and 5 are pertinent to this operation in that FIG. 4 shows two paths of the treated fish when two fish are treated simultaneously and FIG. 5 shows the path of fish in a single lane operation.

Figure 6:
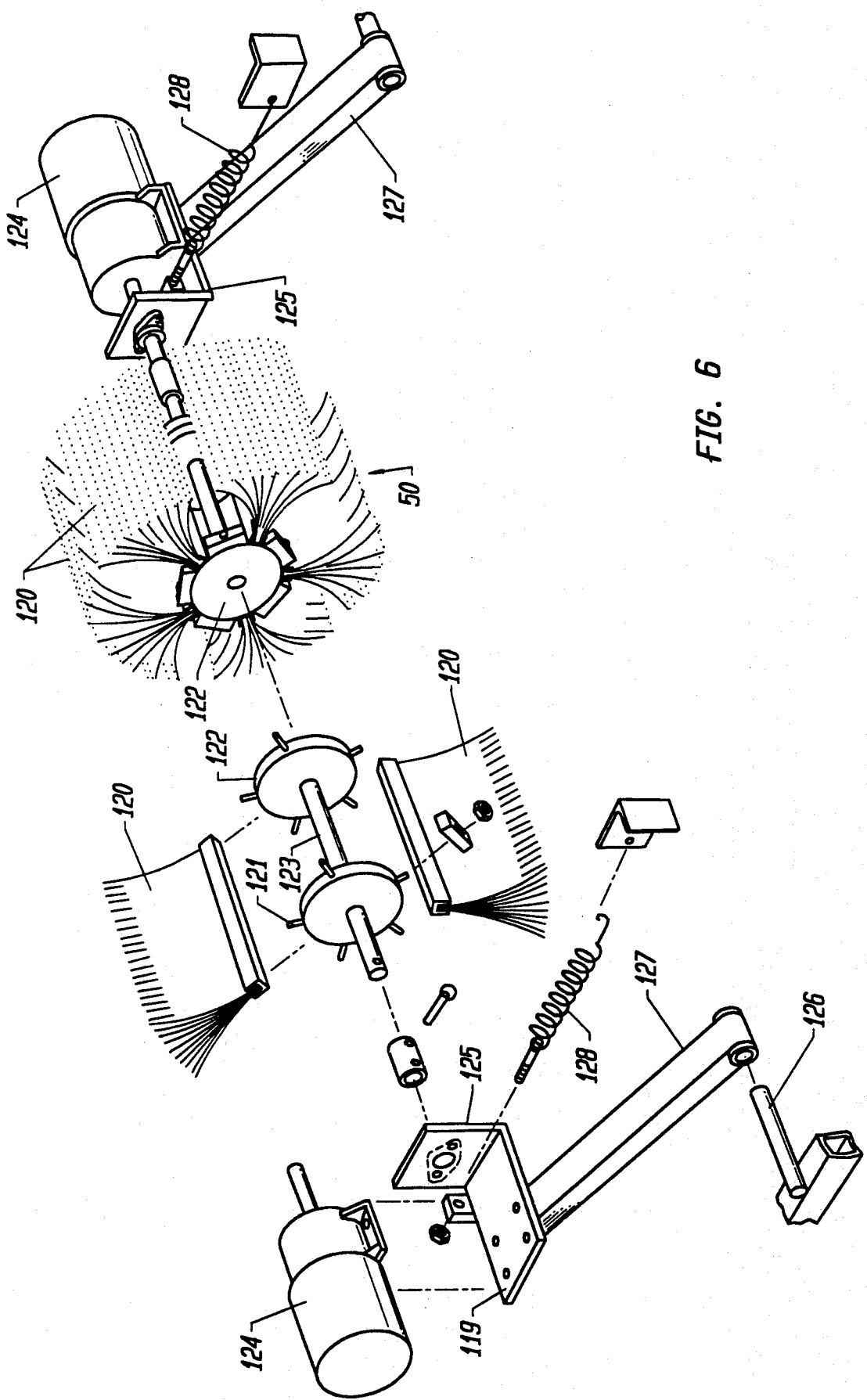
FIG. 6 is an exploded view of the overhead brush that is the first brush to make contact with the fish.

Relative to the foregoing it should be noted that the left side of FIG. 6 is an exploded view of the overhead brush assemblies shown in the right side of FIG. 6, as used for scrapping or polishing, as the case may be. Overhead brush 50 and its counterparts include a series of bristle sections 120 mounted on pins 121 about the outer periphery of disc-shaped hubs 122, attached to rotary shaft or spindle 123. The latter is connected to an electric motor 124 which when energized rotates the brushes. Further, as is apparent from the drawing, motor 124 is mounted on plate 119 so that shaft 123 is journaled in bearing 118 extending through vertical plate 125. Plate 119 is attached to the outer end of rod or bracket 127 for pivotal movement of the full brush assembly about spindle 126, and relative to frame F. In this way, the load of brush 50, for example, against fish passing under it, is controlled by spring 128 extending between frame F and plate 119.

Figure 7:
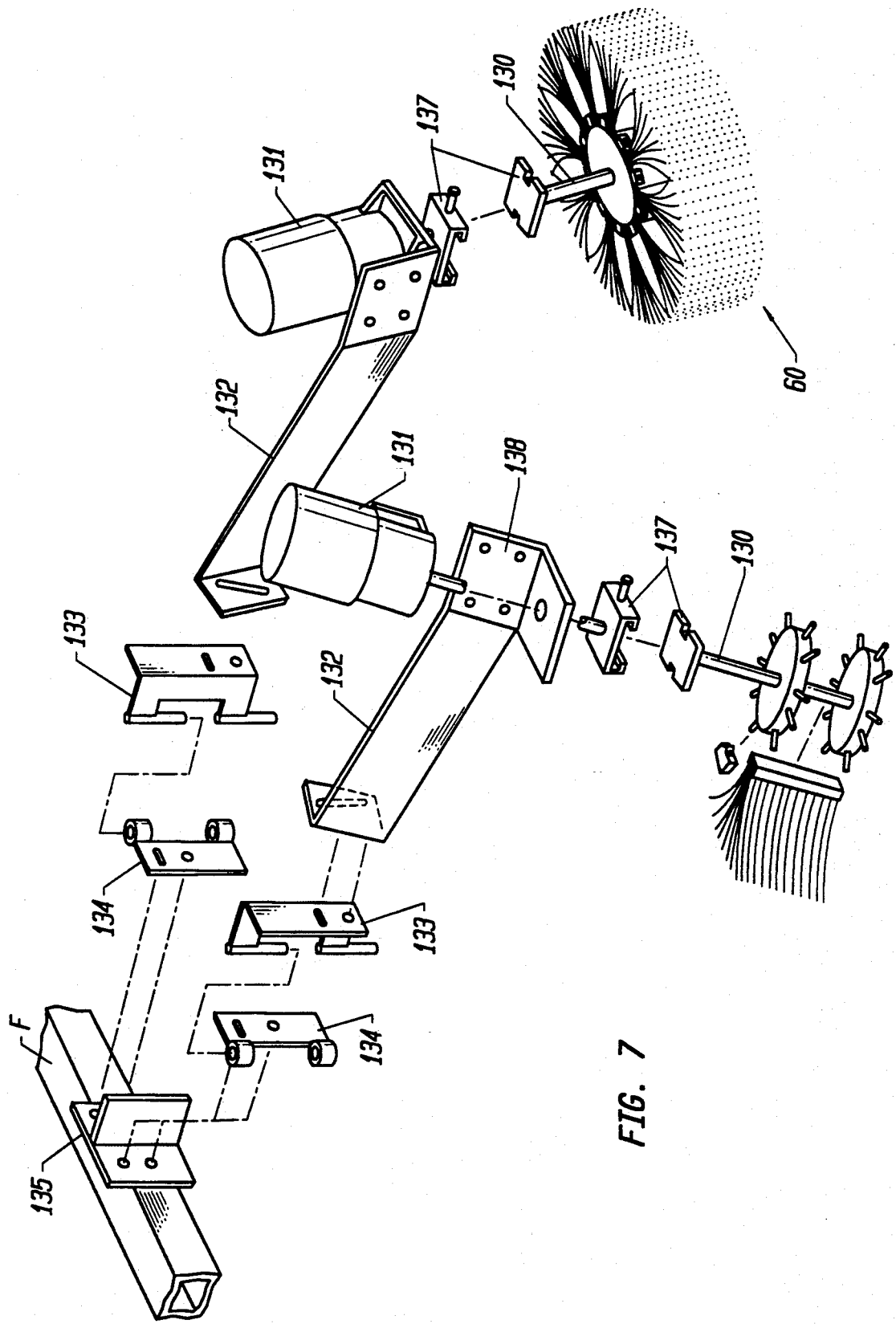
FIG. 7 is an exploded view of the side brush which follows the overhead brush of FIG. 6.

FIG. 7 is similar to FIG. 6 in that it also is an exploded view. However, the assembly shown therein is of the generally horizontally disposed brushes for cleaning the bellies and backs of the fishes which brushes have heretofore been designated as 60, 61, 62 and 63. (See FIG. 1.) The latter brushes are each attached to a generally vertical shaft 130 driven by an electric motor 131 through a tongue and groove coupling 137 between the shafts of the motor and the brush. Each brush assembly includes a plurality of segments attached to pins radially protruding from hubs or discs mounted on drive shaft 130, as in the case of the brushes depicted in FIG. 6. Motor 131 in each instance is mounted on plate 138 carried by bracket 132, which in turn is pivotable for lateral movement of the brush against the back or belly of a fish. Such lateral movement is permitted by supporting bracket 132 on a series of hinged brackets 133 and 134 and fixed bracket 135, rigidly mounted on frame F. It will be particularly noted in FIGS. 1 and 8 that each of these brackets is canted so that the bristles of brushes 60, 61, 62, and 63 are approximately parallel to the surfaces of belts 10 and 20, but the assembly is free to tilt laterally to the left or right to accommodate and conform to the back and belly edges of fish passing on the belts. Canting of the upper brushes 60 and 61, in some applications, may be sufficient to remove skin from the back and belly of each fish while it is on upper belt 10, so that lower brushes 62 and 63 are not required.

Figure 8:
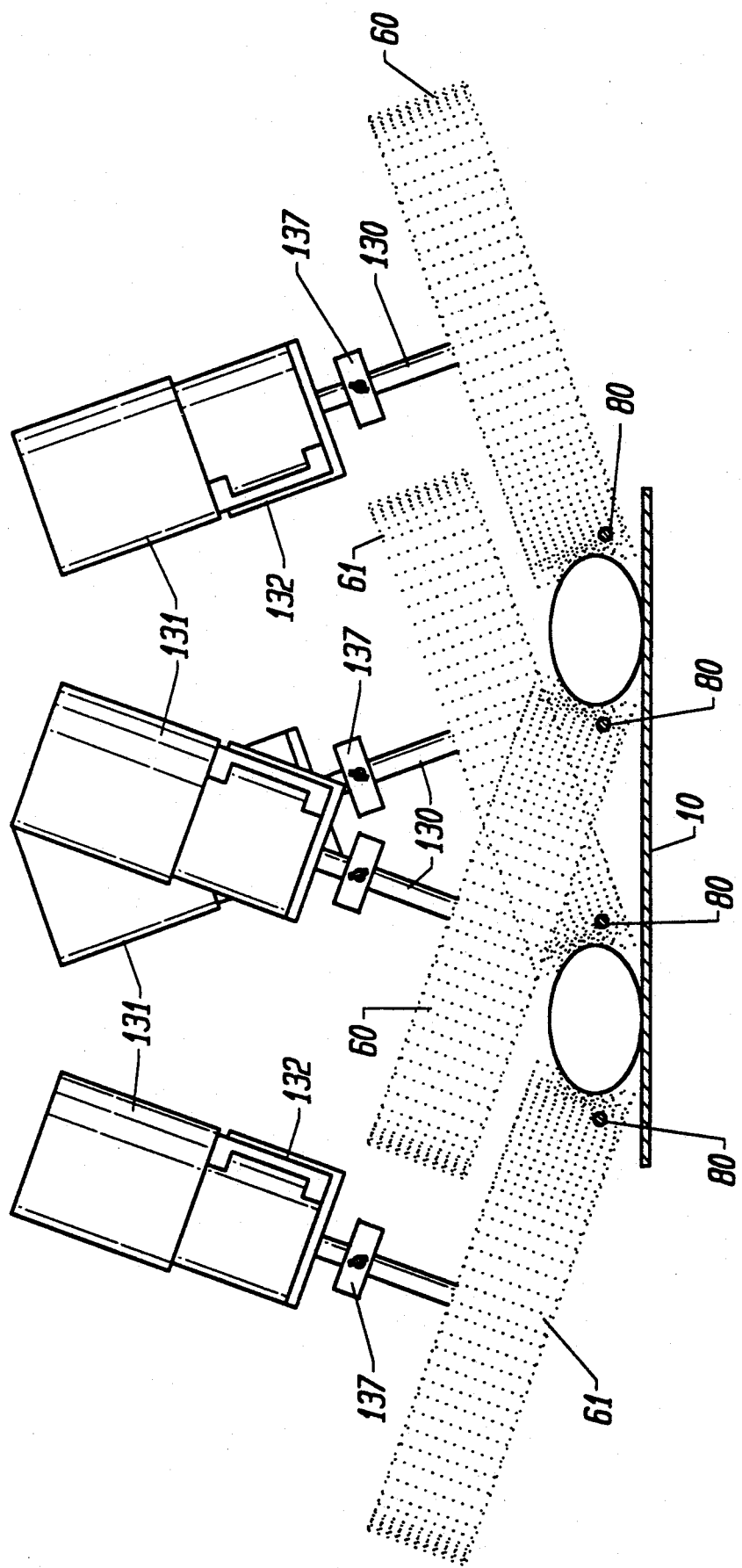
FIG. 8 is a detail transverse section of two brushes showing the fish proceeding in two lanes as shown in FIG. 4.

When assembled brushes 60 and 61, each handling separate lanes of fish, are as shown in FIG. 8, brushes 60 for one lane are set slightly ahead of brushes 61 for the adjacent lane. In this way, satisfactory results are obtained by using separate lanes to simultaneously subject fish in both lanes to the skin scraping operation on belts 10 and 20.

It will be noted that the belts 10, 20 and 30 desirably have non-slip type surfaces such as pebble top belting and the like to minimize the risk of fish slipping on the belt. Such slippage is also largely avoided, certainly minimized, by the tilted position in which the fish are placed so that gravity can assist in keeping the fish secured to the belt while the de-skinning is carried out.

As heretofore mentioned, guide rails 80 are mounted in any convenient manner along the length of upper and lower conveyor belts 10 and 20 to assure that the fish under treatment are properly guided through the machine. Rails 80 assure that the fish will not slip off the belt or otherwise be misdirected with resultant inefficient scale and skin removal. The machine can be operated and the process can be carried out with good results without the use of the guide rails, but the operation is more successful utilizing the guide rails which assure that the de-skinning operation is carried out on track.

It should be noted that overhead brushes, such as brush 50, the side brushes, such as brush 60, are of the simple paddle-type that are intended to brush over the precooked and cool fish to gently remove skin without removing excess flesh. All of the brushes can be rigidly mounted, but advantageously are adapted for movement in a controlled manner to compensate for changing fish shapes. The brushes can be operated to rotate with or against the direction of fish travel. Fish can be fed head end or tail end first into the machine. The machine can effectively de-skin fish regardless of the direction of rotation of the brush.

The preferable method for mounting the brushes is shown in FIG. and FIG. 2 and in the detailed structure thereof in FIGS. 6-9, wherein brush 50, and similar horizontally mounted brushes 51, 52, and 53 are mounted on a spring and lever arm arrangement so that the brush can yield as the thickness of the fish and other requirements necessitate For example, rotating shafts 123 of brushes 120 are each mounted through a motor 124 on plate 119 at the outer end of rod 127. The other end of rod 127 is pivotally supported by spindle 126 on the lower end of bracket 55 affixed to frame F at a point adjacent the feed end of upper conveyor belt 10. L-shaped bracket 55 also anchors one end of spring 128 The other end extends to a bearing mounted on plate 119 to thus permit brush 50 to move up and down as it pivots about spindle 126. This arrangement keeps brush 50 in a position desirably located adjacent to where the fish will pass. Thus, if it must yield to the dimensions of the fish, it is free to do so, to accommodate the thickness of the fish, but the brush is free to return to its normal position on belt 10, after each fish passes. Brush 52 is mounted in a similar manner above belt 20 and is adapted to yield as required by the fish thickness.

Figure 9:
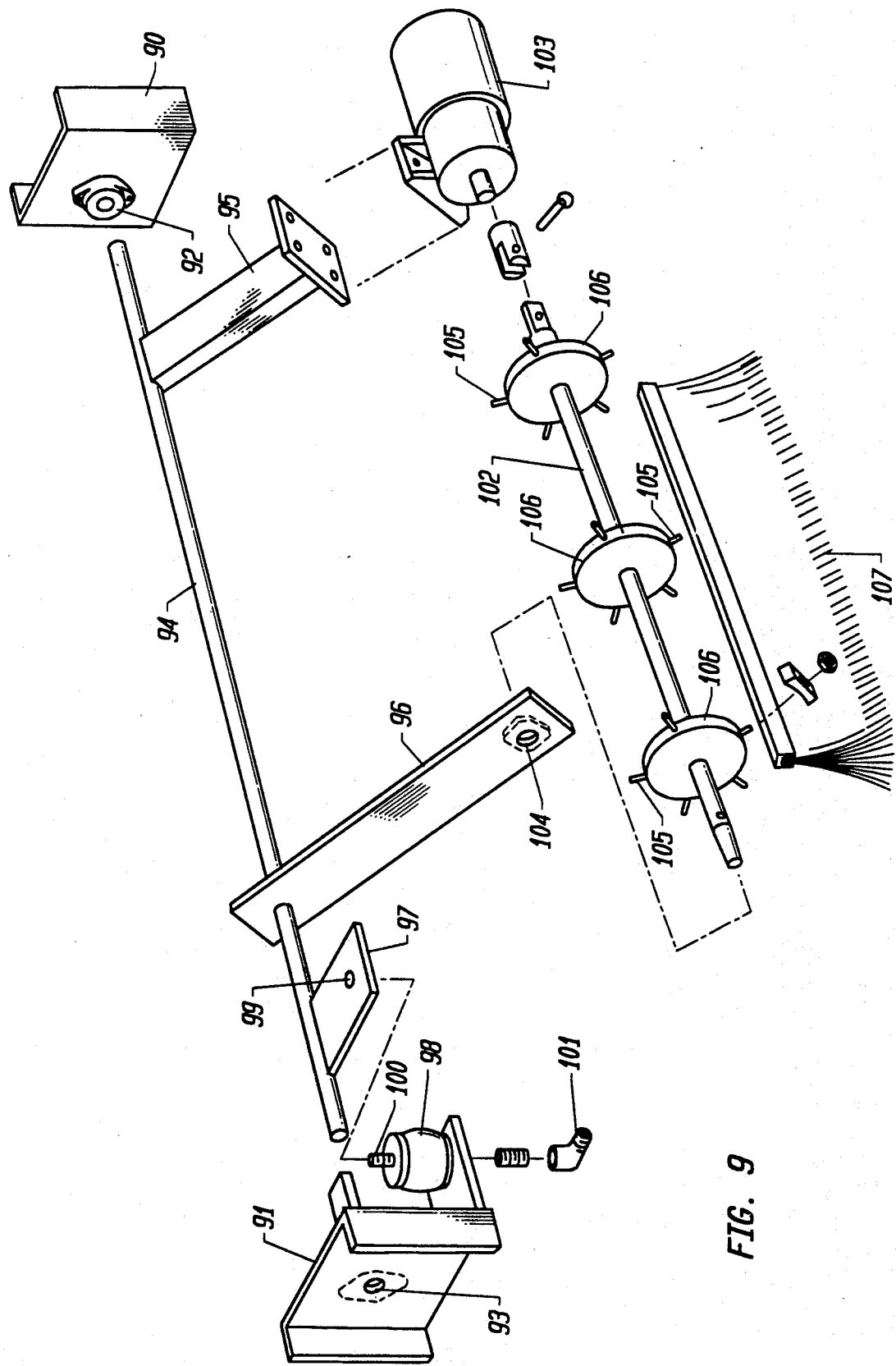
FIG. 9 is an exploded view of the assembly comprising the polishing brush which is one of the many brushes that may be used on this brush assembly.

In a modification of the foregoing the so-called polishing brushes 51 and 53 can be mounted so that they do not need to follow the fish contour when the de-skinning operation is in progress. Instead the brush height is adjusted to between 1½ and 2 inches from the surface of the respective belts. Nevertheless, the brushes can be very useful during the belt cleaning operation. FIG. 9 of the drawings shows the mountings and operations of brushes 51 and 53.

By the arrangement of brackets 90 and 91 being affixed to frame F, sockets 92 and 93 oscillatably support shaft 94, which has attached to it a pair of support rods 95 and 96 for brush shaft 102 and a drive plate 97. Plate 97 is connectable to actuator 100 through opening 99 in plate 97 so as to control the angular position of rotatable shaft 94 when actuator 100 is activated. In this way, the elevation of the brushes relative to fish on belt 10 or 20 can be controlled by rotation of shaft 94. Actuator 100 is operated by a pressurizable elastomeric bellows connectable to the water supply feeding the de-skinning nozzles during de-skinning. Actuation of valve 100 is effected by water pressure applied through pipe 101 to expand the walls of bellows 98 to thereby extend top plate 89 of actuator 100 to keep brush shaft 102 in an elevated position by rotation of attached rods 95 and 96.

As noted above, with rods 95 and 96 in their raised position, polish brush 53 performs another useful function. In this regard it will be seen that the bristles rotate against the under surface of belt 110, just before it returns to its initial fish loading position.

During normal cleaning of the machine and particularly the belts, a check valve (not shown) may be actuated to depressurize bellows 98. This allows rods 95 and 96 to lower brushes 51 and 53 so that they touch their respective surfaces on belts 10 and 20.

Meanwhile, shaft 102 is coupled to electric motor 103 at one end thereof and is adapted to be connected to rod 95. The opposite end thereof is adapted to connect with and rotate within hole 104 provided at the end of rod 96. Pins 105 on the outer periphery of hubs 106 of shaft 102 engage brushes 107. When all brushes are so engaged the assembled brush is a structure such as 51 and 53.

Accordingly, actuation of elastomer bellows 100, when assembled as above described, makes it possible to keep the brushes 51 and 53 a measured distance, e.g., 1½ inches to 2 inches above the belts 10 and 20. Release of water pressure from 101 releases the brushes so that they drop a corresponding distance to reach belts 10 and 20, and rotation thereof enables them to scrub the belts clean.

Top edge and belly edge brushes 60, 61, 62 and 63 are also spring mounted in a manner that enables them to contact a fish and yet yield to the dimensions thereof as is apparent from FIG. 4. They are generally disposed parallel to the surfaces of belts 10 and 20 with their lower ends slightly spaced apart from the center of the travel lane for fish being processed on the belts. As shown in greater detail in FIGS. 7 and 8, the drive motors and brush shafts for each of these brushes is mounted on brackets and hinges and are either spring loaded, or responsive to gravity, to hold the perimeter of the brush against the edges of a fish, but yields to its varying dimensions.

Figure 3:
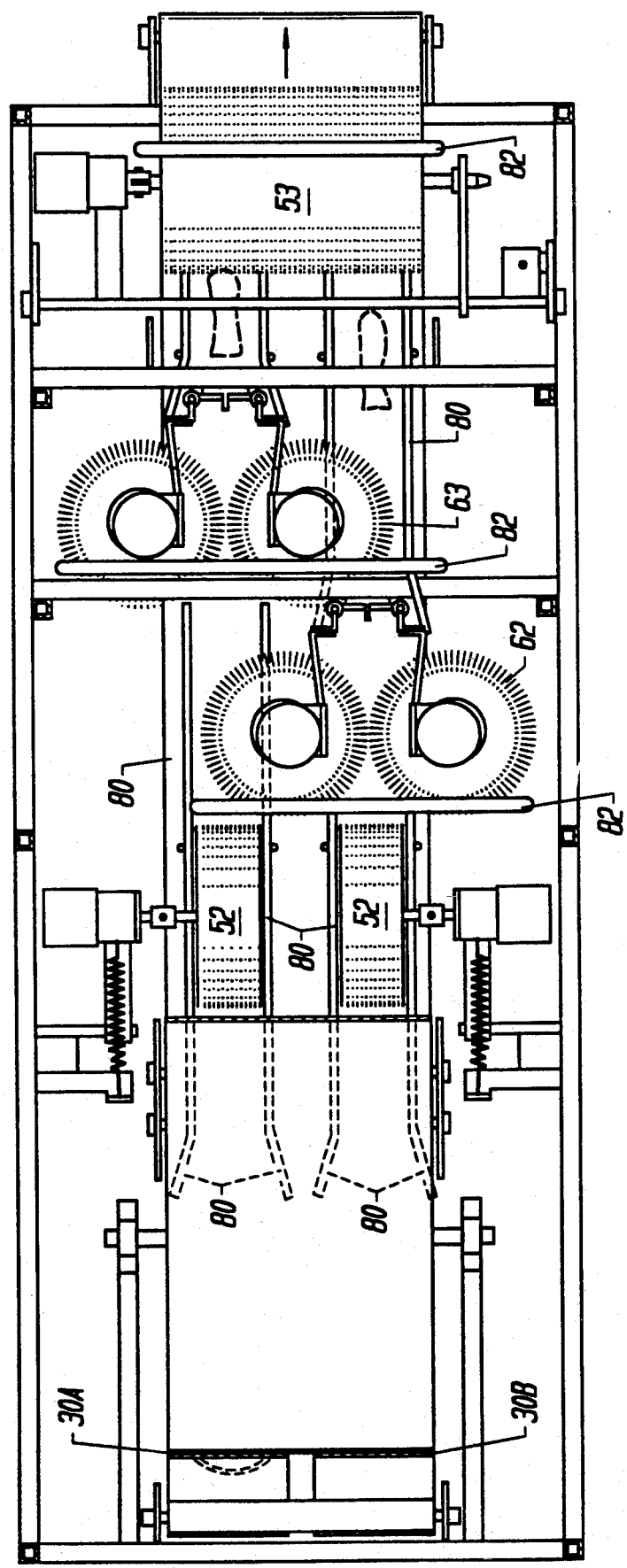
FIG. 3 is a plan section taken along line 3—3 of FIG. I showing the lower treating area of the belt conveyor for the two lanes of fish.

Other parts of the apparatus of the invention which are not shown in FIGS. 1, 2 and 3 and which are essential in its operation are auxiliary overhead sprays. These auxiliary sprays 70, 71, 72 and 73 are shown in FIG. 10 and as will be noted, are located above belts 10 and 20 at appropriate points along their length. These sprays are intended to clean the belt during and after de-skinning and scraping and assist brush sprays 82 in washing scraped skin or any other waste parts of the fish from the surfaces of belts 10 and 20. They also help to keep brushes clean and assure their continuous operation. The skin and other waste material washed from the belts falls to the bottom area of frame F where it is collected and can be readily removed. The sprays 70, 71, 72 and 73 can be used as required and can be adjusted to deliver water at any required pressure and flow rate by means well known to those skilled in the art. In cleaning the belts and brushes the water flow rate is substantially higher than normal flow rates of nozzles 82 during fish skinning.

Various modifications and changes will occur to those skilled in the art from the foregoing description of the preferred embodiments, all such changes or modification coming within the spirit and scope of the following claims are intended to be included thereunder.

We claim:

1. A process for skinning fish comprising:
   precooking and cooling the fish until the temperature thereof is such that the skin thereof is amenable to removal by brushing contact with minimum damage to the meat of the fish thereunder;
   placing said fish on conveyor means moving, toward a series of rotating brushes above and adjacent to the belly and back of said fish so that the bristles on the brushes contact the fish and remove the skin from the side, belly and back of each said fish without tearing the meat adjacent thereto;
   spraying water on said rotating brushes at the fish-brush interface and said belt conveyor means to assist in washing way loosened skin;
   passing each said fish into turn-over means wherein said fish is turned over to expose the opposite side thereof for delivery to second conveyor belt means;
   passing said over-turned fish on said second conveyor belt means toward a second series of rotating brushes above said over-turned fish so that the bristles on the brushes contact said opposite unbrushed side of each said fish and remove the skin from said opposite side thereof without tearing the meat adjacent thereto;
   further spraying water at the fish-brush interface between said opposite side and said second brushes; and
   thereafter recovering said washed and deskinned fish from said second conveyor belt.

2. The process of claim 1 wherein said second series of rotating brushes includes a pair of brushes for contacting the edges of the back and belly of each fish to remove remaining portions of skin therefrom.

3. The process of claim 1 wherein said conveyors are belts of sufficient width that a plurality of rows of fish can be subjected to treatment simultaneously.

4. The process of claim 1 wherein said belt conveyors conducting said fish through and past said rotating brushes are at an angle of approximately 10° upward from the horizontal to reduce slippage on said belt.

5. An apparatus for skinning both sides of a fish and the top edge and belly thereof in a single pass of a fish through the apparatus comprising upper conveying means for receiving fish and moving the same toward generally horizontally and generally vertically rotating brushes mounted on axes substantially parallel and perpendicular, respectively, to said upper conveying means, said brushes being spaced from each other along said upper and lower conveying means over a distance sufficient to permit a fish to be scraped so that the skin thereof is removed by contact of the bristles of said brushes with the fish skin, and means between the discharge end of said upper conveying means and the entrance end to said lower conveying means for turning said fish over so that the upper scraped side thereof is reversed and lies on the lower conveying means with the reverse side thereof exposed for scraping treatment by at least generally horizontal rotating brushes generally parallel to the width of said lower conveying means.

6. Apparatus in accordance with claim 5 which additionally includes rotating brushes generally perpendicular to said lower conveying means.

7. The apparatus of claim 5 wherein said turnover means comprises a rotating drum-like wheel having a flat surface which receives a partially scraped fish from said upper conveying means, an intermediate belt mounted to press against said drum over a distance generally equal to the path of travel of a fish around said wheel at a pressure sufficient to hold said fish in place while not crushing the partially scraped fish and arranged to deliver said fish to said lower conveying means, for completion of scraping and polishing.

8. The apparatus of claim 5 wherein said upper and lower conveying means each comprise continuous belts and said rotating brushes comprise a rotating scraping brushmounted on a horizontal axis positioned to permit the bristles of said first brush to contact the upper exposed side of a fish to be scraped as said fish moves along each said belt, and at least one pair of rotating scraping brushes supported on opposite sides of the paths of travel for said fish on said upper conveying belt, said brushes having their axes generally perpendicular to said upper belt and intermediate the length of said belt to permit said fish to pass therebetween to scrape the top edge and belly of said fish, and a rotating polishing brush mounted on a horizontal axis thereafter along the length of both said belts and adjacent the ends of said paths of travel thereon.

9. The apparatus of claim wherein water spray means are positioned to spray water on each said rotating brushes adjacent the initial contact of each brush with said fish on said upper and lower continuous belts and to wash scraped fish skin therefrom.

10. The apparatus of claim 8 wherein at least another pair of rotating scraping brushes are supported on opposite sides of the path of travel over said lower conveying means.

11. The apparatus of claim 7 wherein said turn over means includes at least one drum-like wheel and at least two cooperating intermediate belts for each separate path for said fish to be treated.

12. The process of claim 1 wherein the first moving conveyor means is a continuous belt that runs from a rotating pulley at the entrance end of said belt to the top of said rotating drum while holding the fish in stationary position, retaining said position of said fish as said belt moves around about half of the circumferential surface of said drum to thereby turn the fish over on its opposite side, delivering said fish at the base of said drum to a second moving conveyor means, while said first belt returns upwardly for travel around said pulley at the entrance end thereof, passing said fish along said second conveyor means while scraping at least the newly exposed surface thereof, and recovering said scraped fish.

13. The process of claim 1 wherein auxiliary water is simultaneously sprayed onto said rotating brushes and on the adjacent portion of the surface of said first and second conveyor belt means to assist removal of skin and scales from said brushes and belt surfaces.

* * * * *

UNITED STATES PATENT AND TRADEMARK OFFICE
CERTIFICATE OF CORRECTION

PATENT NO. : 5,197,916
DATED : March 30, 1993
INVENTOR(S) : Orlando, et al.

It is certified that error appears in the above-identified patent and that said Letters Patent is hereby corrected as shown below:

Column 3, line 22, delete "I" and insert --1--.

Column 4, line 1, delete "was".

Column 4, line 4, delete "Addition" and insert --Additionally--.

Column 4, line 24, insert --.-- following the word later.

Column 8, line 27, insert --1-- following the words shown in FIG.

Column 8, line 32, insert --.-- following the word requirement and delete "necessitate".

Column 8, line 39, insert --.-- following the number '128'.

Column 11, line 14, delete "brushmounted" and insert --brush mounted--.

Column 11, line 28, insert --§-- following the word claim.

Signed and Sealed this

Fourteenth Day of December, 1993

Attest:

BRUCE LEHMAN

*Attesting Officer*     *Commissioner of Patents and Trademarks*